United States Patent [19]

Brokholc

[11] Patent Number: 5,797,618
[45] Date of Patent: Aug. 25, 1998

[54] SPRING STRUT FOR A FRONT WHEEL SUSPENSION OF THE MCPHERSON TYPE FOR MOTOR VEHICLES

[75] Inventor: Michal Brokholc, Askim, Sweden

[73] Assignee: AB Volvo, Sweden

[21] Appl. No.: 765,317

[22] PCT Filed: Jun. 27, 1995

[86] PCT No.: PCT/SE95/00798

§ 371 Date: Mar. 17, 1997

§ 102(e) Date: Mar. 17, 1997

[87] PCT Pub. No.: WO96/00663

PCT Pub. Date: Jan. 11, 1996

[30] Foreign Application Priority Data

Jun. 28, 1994 [SE] Sweden .................. 9402290

[51] Int. Cl.[6] ............................................. B60G 21/00
[52] U.S. Cl. ..................... 280/689; 280/663; 280/668
[58] Field of Search ................................. 280/689, 663, 280/668, 665, 726

[56] References Cited

U.S. PATENT DOCUMENTS

| | | | |
|---|---|---|---|
| 4,542,920 | 9/1985 | Kijima et al. | 280/689 X |
| 4,632,423 | 12/1986 | Tanahashi | 280/689 |
| 4,784,406 | 11/1988 | Stinson | 280/665 |

FOREIGN PATENT DOCUMENTS 0 312 711 A2  7/1988  European Pat. Off. .
0 552 438 A1  11/1992  European Pat. Off. .

OTHER PUBLICATIONS

English Abstract of Japanese Patent No. 61-200015(A), 09/04/86.

*Primary Examiner*—Christopher P. Ellis
*Attorney, Agent, or Firm*—Lerner, David, Littenberg, Krumholz & Mentlik

[57] ABSTRACT

Spring strut for a front wheel suspension arrangement of the McPherson type for motor vehicles, which spring strut (1) presents a link bracket (40) for a stabilizer link intended to be pivotably arranged on the spring strut of a stabilizer forming part of the vehicle's front wheel suspension. The link presents a pivot portion (38) with an attachment means (39) for mounting the link on an attachment point on the link bracket. With respect to its attachment point, the link bracket (40) is oriented to adopt a fixed angular position in relation to the angular position for the wheel axis of the wheel axle, as determined by the carrier for the wheel axle. The angular position is the same for both spring struts in the vehicle's front suspension with respect to a turning angle about the longitudinal axis of the spring strut in relation to the wheel axis. Furthermore, the angular position deviates from 180° by an angular deviation (v) which is identical for both left and right spring strut, as viewed clockwise for both spring struts. The angular deviation is chosen so that the pivot portion of the stabilizer is positioned symmetrically on both sides of the vehicle, and essentially directed opposed to the axis direction of the wheel axle.

3 Claims, 4 Drawing Sheets

5,797,618

1

SPRING STRUT FOR A FRONT WHEEL SUSPENSION OF THE MCPHERSON TYPE FOR MOTOR VEHICLES

TECHNICAL FIELD

The present invention relates to a spring strut in accordance with the preamble of appended claim 1.

BACKGROUND OF THE INVENTION

In the field of spring strut suspensions of the McPherson type it is previously known to arrange the stabilizer in the suspension arm of the front wheel suspension. In order to provide a more effective damping of swaying movements, nowadays the stabilizer is often mounted in the spring strut of the front wheel suspension, so as not to lose distance of the ends of the stabilizer. The stabilizer is provided with a stabilizer link in both its ends, which link has a pivot portion so as to follow the spring movements as well as the turning movements of the spring strut. For the mounting of the link in the spring strut via the pivot portion, the pivot portion is provided with attachment means intended to be mounted on a link point on the spring strut.

In order to provide the link bracket with the most rational, space-saving and easily mountable design possible, the attachment means is arranged with such an orientation that the link bracket is usually given a position which is outside of the desired position of the pivot portion, which position is essentially diametrically opposite to the angular position of the wheel axle. Up to now, the link bracket has therefore been arranged on the spring strut, separately for the left and the right spring strut, respectively. The remaining parts of the spring strut are identical for the left and the right side, respectively, which is the case, for example, as regards the position of the seat for the included spring device and the positioning of the carrier of the spring strut for the wheel axle. Thus, previously known solutions have required that the left and the right spring struts should be manufactured separately, taking only the position of the link bracket into consideration. This has resulted in logistic costs regarding everything from manufacturing to assembly.

SUMMARY OF THE INVENTION

The object of the present invention is to eliminate the above-mentioned drawbacks regarding the fact that separate spring struts for the left and the right side, respectively, are provided in the front wheel suspension of a motor vehicle.

Said object is achieved by means of a spring strut according to the present invention, the features of which are apparent from the appended claim 1.

BRIEF DESCRIPTION OF THE DRAWINGS

The invention will be described in greater detail in the following with respect to an embodiment, with reference to the accompanying drawings, in which:

FIG. 4 shows schematically a cross-section from above through both of the spring struts, forming part of a front wheel suspension, whereas

PREFERRED EMBODIMENT

Figure 1:
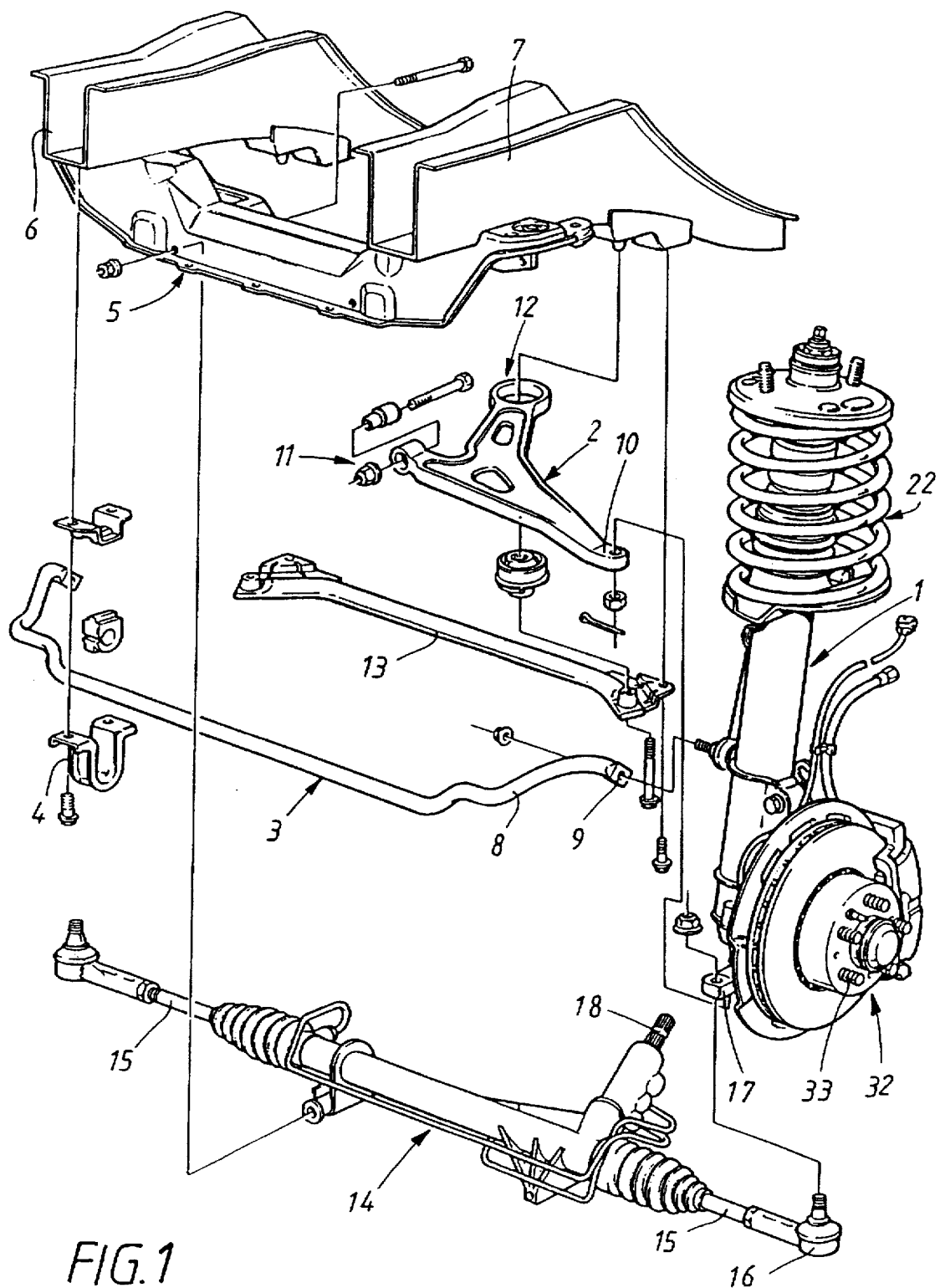
FIG. 1 in an exploded view shows an essentially complete front wheel suspension with a spring strut according to the invention, intended for one side of a motor vehicle.

The complete front wheel suspension shown in FIG. 1, intended for the left front wheel of a motor vehicle shall be described here only with respect to its main parts, since the wheel suspension generally is of the McPherson type, and thus well known. The front wheel suspension implies that the wheels are individually suspended. The wheel suspension is essentially formed on each side of the vehicle by a spring strut 1 and a suspension arm 2. A stabilizer extends between the two spring struts, which stabilizer is mounted by means of a pair of consoles 4 in each of the two side beams 6, 7 of the vehicle body 5, in a manner which is well known. The stabilizer is designed with two outer crank-like portions 8 having ends 9 which are adapted to follow the movements of the spring strut, and thus those of the corresponding wheel, and which serve as a torsion spring in order to impede the swaying movements of the vehicle body when rounding a curve. The spring strut 1 is at the upper part thereof disposed in the vehicle body in a manner which is not shown, although well known, and is at the lower part thereof disposed in relation to the outer end part 10 of the suspension arm in order to allow the turning of the spring strut about its longitudinal axis and pivotal movements of the suspension arm. By means of two anchoring points 11, 12 at its inner portion, the suspension arm 2 is pivotably arranged in the vehicle body essentially for pivoting of the suspension arm 2 about a horizontal axis. A cross member 13 is mounted in the two side beams 6, 6 and also serves to stiffen the inner, rear pivot point 12 on the suspension arm 2.

FIG. 1 also shows the steering mechanism 14 with steering connecting rods 15, the outer ends of which are connected to an arm 17 which is pivotally fixed to the spring strut. For steering of the wheels, the pivotal position of the spring strut about its longitudinal axis is controlled in a known manner by means of a linear movement of the steering connecting rods 15 depending on the turning of the steering wheel shaft 17.

Figure 2:
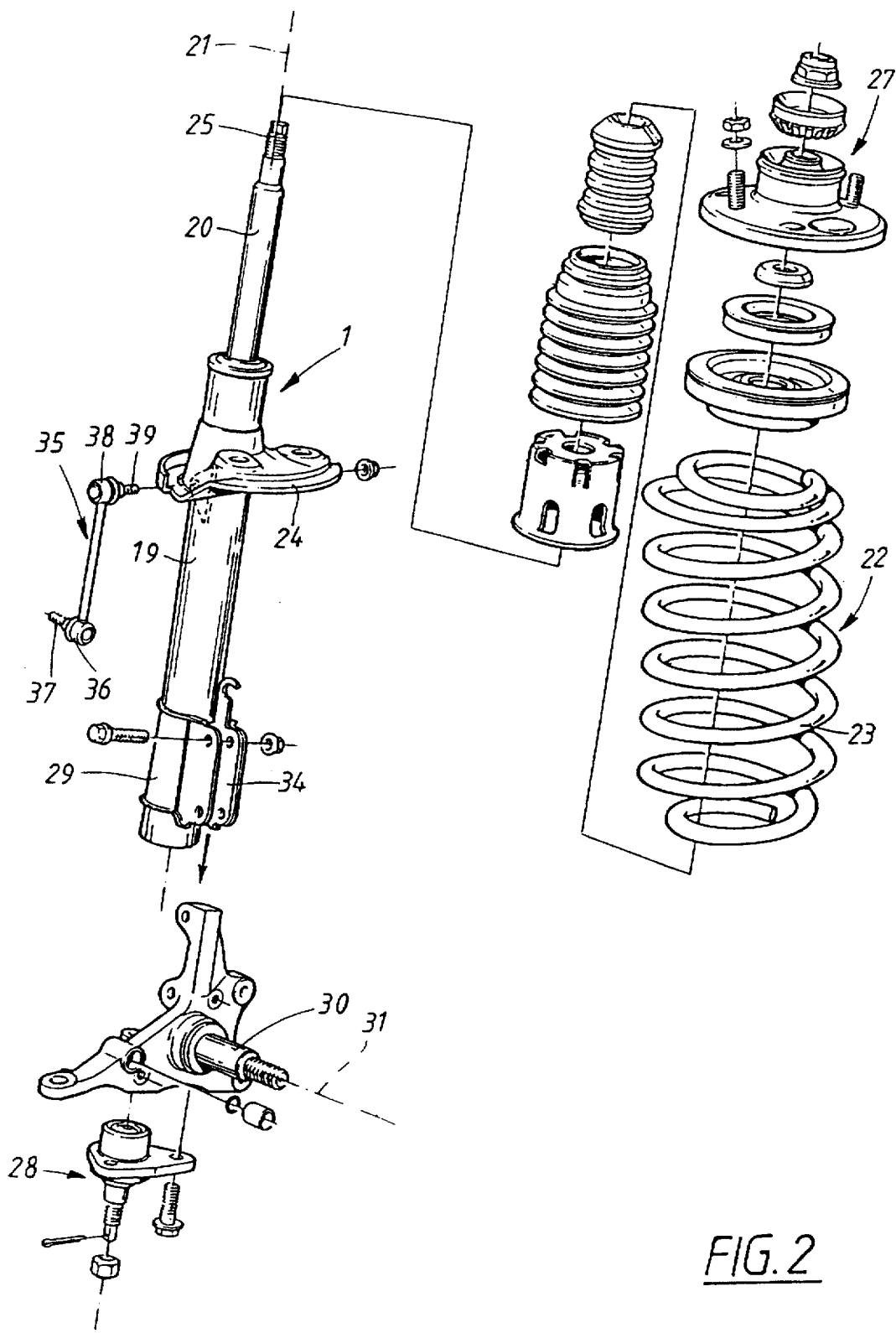
FIG. 2 shows an exploded view of the spring strut and component included therein.

As is best shown in FIGS. 1 and 2, the spring strut 1 is formed by a tube 19 having a built-in shock absorber, the cylinder portion of which is fixed in the tube 19. The piston portion 20 of the tube 19 is linearly movable with a dampened movement along the longitudinal axis 21 of the spring strut. The spring strut supports a spring means 22 which is essentially arranged with a screw spring 3 of the compression spring type, which rests on a lower seat 24 which is attached to the tube 19. In the upper end 25 of the piston portion, the spring strut 1 is pivotably arranged in the vehicle body, normally in the wheel housing and in a manner which is not shown. This mounting is integrated with an upper seat 27 for the screw spring, the seat being pivotably arranged in the wheel housing.

The spring strut 1 presents at its lower part a lower bearing element 28 which is intended for the pivotal arrangement of the spring strut in the outer end portion 10 of the suspension arm 2. The bearing element 28 allows turning movements at the spring strut about the longitudinal axis 21 as well as pivotal movements of the suspension arm 2 about its essentially horizontal axis. Furthermore, the spring strut presents at its lower part a carrier 29 for a wheel axle 30 which is intended for the rotatable mounting of the corresponding wheel about its wheel axis 31, which axis is essentially transversely arranged in relation to the longitudinal axis 21 of the spring strut. As is apparent from FIG. 1, the wheel is supported by means of the hub 32 of the wheel, which hub also supports the brake assembly of the wheel. Threaded studs 33 are arranged at the outer side of the hub, which studs are positioned so as to extend through the holes of the wheel and to be held by means of wheel nuts.

The carrier 29 for the wheel axle 30 is provided with two attachment flanges 34 facing outwardly and is also rotatably fixed on the tube 19 of the spring strut. Thus, it defines a rotationally fixed angular position for the wheel axle 30 in relation to the tube of the spring strut.

In order to enable the mounting of the stabilizer 3 at the pivotable spring strut 1, the stabilizer is provided with a stabilizer link 35 which is pivotably connected between each of the ends 9 and each of the spring struts 1. The link 35 presents a lower pivot portion 36 in the form of a ball joint with a pivot bracket 37, intended for attachment on the end 9 of the stabilizer. The link 35 further presents an upper pivot portion 38 in the form of a ball joint with a pivot bracket 39 in the form of a threaded screw, which is intended to be mounted on the spring strut 19.

Figure 3:
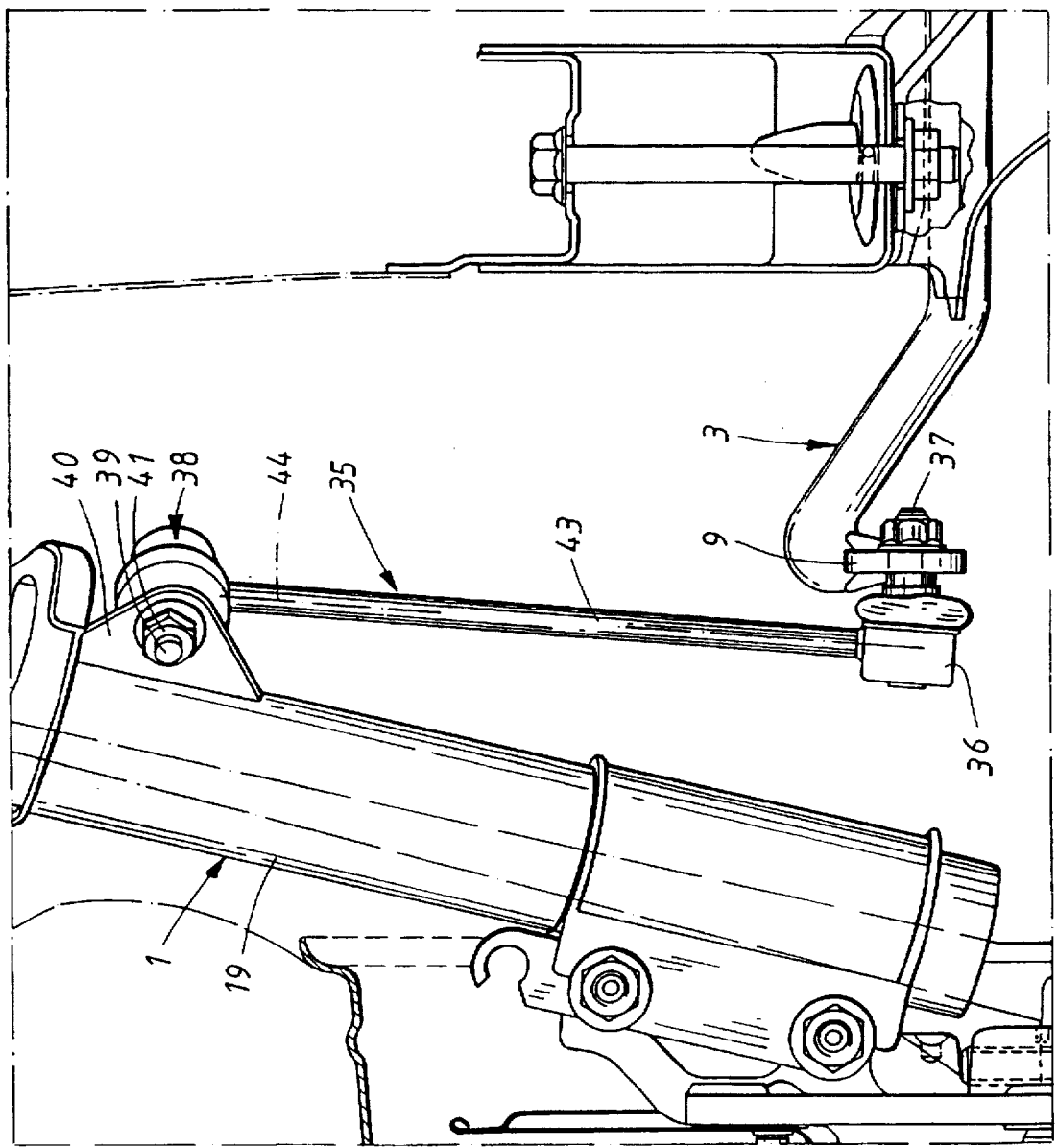
FIG. 3 shows a partially broken perspective view on a larger scale, essentially of the spring strut on one of the sides, from which the mounting of the stabilizer is apparent.

As is best apparent from FIG. 3, the spring strut 1, or more precisely the tube 19, is provided with a link bracket 40 for the stabilizer link 35. In the shown example, the link bracket 40 is formed by a console in the form of a lug or a flange which is rotatably fixed to the spring strut 1, or more precisely the tube 19, in a fixed angular position in relation to the carrier of the spring strut for the wheel axle 31, which is not shown in FIG. 3. This component extends essentially horizontally in the plane of the paper, with a small deviation for maintaining the correct wheel geometry. The link bracket 40 presents an attachment point 42 which in the shown example is formed by a hole through the lug and the surrounding edge areas. The pivot bracket 39 of the upper pivot portion 38 extends through the hole, the pivot portion 38 being secured against one side of the flange by means of a nut 41 which is attached on the other side thereof. The two sides form said edge areas of the hole. In a corresponding manner, the pivot bracket 37 of the lower pivot portion 36 is in the form of a threaded screw or stud which is inserted through the flange-like end 9 of the stabilizer 3, which end is provided with a hole. The two pivot portions 36, 38 present a pivot ball, not shown, on which the pivot bracket 39 is fixed. A pivot capsule for the pivot ball is fixed on the arm 43 of the link, the extension of which in the longitudinal direction is defined by its longitudinal axis 44. It is possible that the pivot capsule in one or both of the pivot portions 36, 38 is pivotably arranged in relation to the arm 43. However, in the axial direction it is essentially undisplaceable in relation to the arm. Thus, the two pivot brackets 37, 39 are allowed, within certain limits, to be arranged in different angular positions and they will allow pivotal movements between the end 9 of the stabilizer and the link bracket 40 of the spring strut. In the view according to FIG. 3, the lower pivot bracket 37 extends essentially horizontally in an inwards direction towards the longitudinal axis of symmetry of the vehicle, whereas the upper pivot bracket 39 is also oriented in an essentially horizontal direction, although in a fixed angle in relation to the plane of the paper.

FIG. 3 shows the front wheel suspension on the left side, that is, as seen from behind with the view being positioned in one plane which is perpendicularly arranged in relation to the longitudinal axis of the vehicle, and essentially in a vertical plane. From the view it is apparent that the link bracket 40 is arranged in an angular position in relation to this transversely arranged plane and extends, in the shown example, at an angle which is chosen slightly rearwards. On this side of the vehicle, the pivot portion 38 is arranged in front of the link bracket 40, by means of which the pivot portion obtains the most symmetrical position, which will be described below in greater detail.

The above-mentioned optimal symmetry as regards the positioning of the upper pivot portion 38 is desired so as to give the stabilizer optimal damping properties with respect to the steering, i.e. the movements of the spring strut. According to the invention this is achieved by maintaining the same position of the link bracket 40 for all of the spring struts, i.e. for the left side as well as the right side. For technical reasons with respect to the function and the design, the pivot bracket 39 of the upper pivot portion 38 also extends essentially transversely in relation to the longitudinal axis 44 of the arm 43. However, by means of the pivotal function it allows a pivotal movement with an angular deviation within a fixed angular interval. Furthermore, the mounting of the link 35 on the spring strut 1 is chosen so as to provide a rational, assembly-effective and space-saving mounting. Consequently, the mounting was chosen in a manner so that the longitudinal axis 45 of the upper pivot bracket 39 forms an inclined angle to an imaginary connection plane 46 through the longitudinal axes of the two spring struts 1, as regarded when the wheel suspension is in a neutral position, i.e. with the wheels being in a position pointing straight forwards and the wheel axes 31 extending essentially parallel in relation to each other, and in a parallel manner or a manner essentially coinciding with the plane 46. In this position, the pivot bracket 39 is accessible for mechanical assembly of the nut 41.

Figure 4:
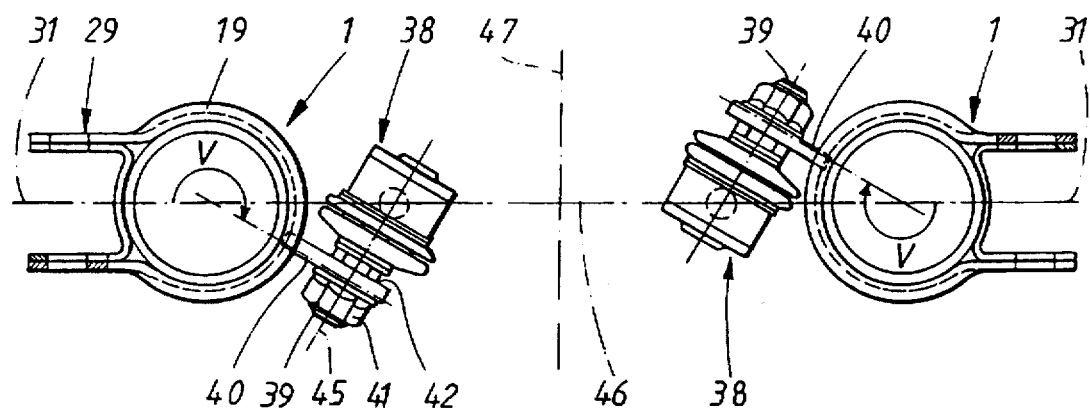

The direction of the wheel axes 31 is determined by the wheel axle carrier 29 of the spring strut 1. In order to achieve said symmetrical mounting of the pivot portion 38, the pivot point thereof is disposed essentially diametrically opposite the axis direction of the wheel axle, i.e. it is essentially positioned in a plane 46 which coincides with the longitudinal axis 21 of the wheel axis 31 and the spring strut 1, as is shown in FIG. 4. However, in practice the pivot point is slightly displaced, with respect to the wheel geometry. According to the invention, the link bracket 40 is angularly turned with a certain angle v about the longitudinal axis 21 of the spring strut, in relation to the direction of the wheel axis 31, as regarded with an angular displacement, for example clockwise, as regards both the left and the right spring strut. In this manner, the link bracket 40 will thus not obtain a mirror-symmetrical position as regards the symmetry about the symmetrical longitudinal axis 47 of the vehicle. Instead, a mirror-symmetry about the common transverse plane 46 is obtained. Thus, on one side of the vehicle, i.e. on the left side in the shown example, the link bracket 40 is angularly arranged slightly rearwards as has been mentioned before, whereas the pivot portion 38 is disposed in front of the bracket. On the opposite side, i.e. on the right side in the shown example, the link bracket 40 is angularly arranged slightly forwards, whereas the pivot portion 38 with its pivot bracket 39 is brought from the other direction so that the pivot portion 38 is positioned behind the pivot bracket. The functionally essential part, i.e. the pivot portion 38, is on both sides disposed and directed essentially diametrically opposite to the direction of the wheel axis, with an angular deviation which is selected with reference to the wheel geometry. In order to save space, the two spring struts 1 have been shown with a relative interspace which is too short to have the correct proportions. In practice, the plane 46 through the wheel axis 31 does not coincide, due to the wheel geometry.

Figure 5:
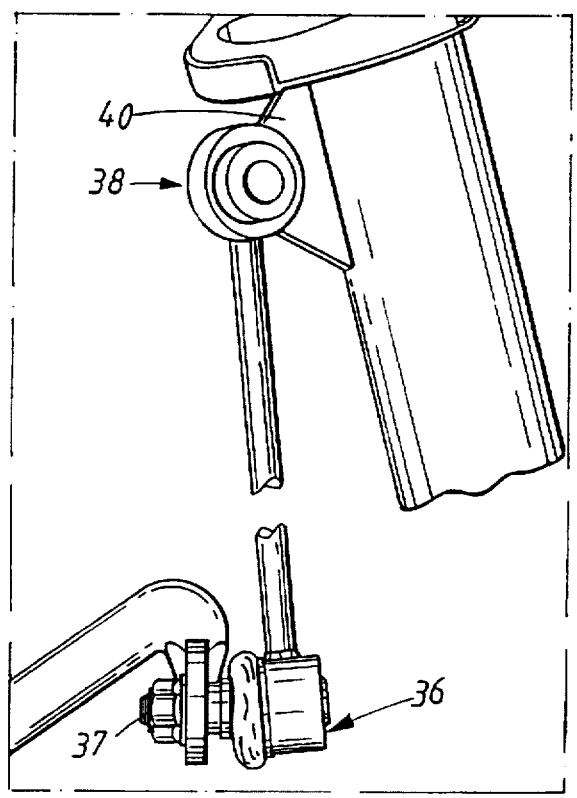
FIG. 5 shows a partially broken view of the spring strut on the other side of the motor vehicle.

By means of a simplified view, which however corresponds essentially to the view of FIG. 3, FIG. 5 illustrates the position of the pivot bracket and the pivot portion on the opposite side; in the shown example the right side. The same effect is obtained by instead inclining the pivot bracket 40 with a corresponding angle on the left side and placing the pivot portion on the other side of the pivot bracket. An angular positioning of the pivot bracket in the rearwards direction is thus obtained of the pivot bracket, whereby the pivot portion 38 is positioned in front of the pivot bracket which extends essentially through an axial plane through the longitudinal axis 21 of the spring strut 1.

By means of the above-mentioned solution, a spring strut for use for both the right and the left can thus be manufactured without having to give the pivot position different positions during the manufacture. Instead, the correct position for the pivot portion of the stabilizer link can be obtained by positioning the pivot portion on each of the two sides, respectively.

The invention is not limited to the embodiments which are described above and shown in the drawings, but may be varied within the scope of the appended claims. For example, the stabilizer may be separated into two parts, its inner end being fixed in the vehicle body. The wheel suspension may have another construction regarding its details.

I claim:

1. Spring strut for a front wheel suspension of the McPherson type for motor vehicles, which spring strut (1) comprises a shock absorber and is adapted to be mounted in the vehicle body (5) at its upper portion, so as to provide a pivotal movement about its longitudinal axis (21), and to carry a wheel axle (30) at its lower portion for rotatably carrying one wheel of the vehicle about a wheel axis (31) which is essentially transverse in relation to the longitudinal axis of the spring strut, wherein the spring strut is adapted to carry a spring means and at its lower portion presents a carrier (29) for said wheel axis, which carrier is pivotably fixed to the spring strut, and a link bracket (40) for a stabilizer link (35), which link bracket is arranged above the carrier, for pivotably arranging at the spring strut of a stabilizer (3) forming part of the vehicle's front wheel suspension, said link presenting a pivot portion (38) with an attachment means (39) for mounting the link on an attachment point on said link bracket, characterized in that said link bracket (40), with respect to its attachment point, is oriented to adopt a fixed angular position in relation to the angular position of the wheel axis of the wheel axle as determined by the carrier for the wheel axle, the angular position being the same for both of the spring struts in the vehicle's front suspension with respect to a turning angle about the longitudinal axis of the spring strut in relation to the wheel axis and deviates from 180° by an angular deviation (v) which is identical for both the left and the right spring strut as viewed clockwise for both spring struts, and that the angular deviation is chosen so that the pivot portion of the stabilizer link is positioned symmetrically on both sides of the vehicle and essentially directed opposite to the axis direction of the wheel axle (30).

2. Spring strut according to claim 1, characterized in that the pivot portion (38) of the stabilizer link (35) is mounted on one side of the link bracket (40) for the front wheel suspension for the first wheel of the vehicle, whereas the pivot portion (38) is mounted on the opposite side of the link bracket for the front wheel suspension for the second wheel of the vehicle.

3. Spring strut according to claim 2, characterized in that the link bracket (40) is designed as an essentially plane attachment lug with a hole which defines said attachment point (42) for insertion of the attachment means (39) of the pivot portion (38).

* * * * *

UNITED STATES PATENT AND TRADEMARK OFFICE
CERTIFICATE OF CORRECTION

PATENT NO. : 5,797,618
DATED : August 25, 1998
INVENTOR(S) : Brokholc

It is certified that error appears in the above-identified patent and that said Letters Patent is hereby corrected as shown below:

On the cover page, in the Abstract, line 21, after "axle." insert --(Figure 4)--.

Column 2, line 32, "6, 6" should read --6, 7--.

Signed and Sealed this

Twenty-second Day of December, 1998

Attest:

BRUCE LEHMAN

*Attesting Officer*      Commissioner of Patents and Trademarks